(12) United States Patent
Gennett et al.

(10) Patent No.: US 8,940,444 B2
(45) Date of Patent: Jan. 27, 2015

(54) HYBRID RADICAL ENERGY STORAGE DEVICE AND METHOD OF MAKING

(75) Inventors: Thomas Gennett, Denver, CO (US);
David S. Ginley, Evergreen, CO (US);
Wade Braunecker, Boulder, CO (US);
Chunmei Ban, Littleton, CO (US);
Zbyslaw Owczarczyk, Littleton, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 13/476,951

(22) Filed: May 21, 2012

(65) Prior Publication Data

US 2012/0295166 A1 Nov. 22, 2012

Related U.S. Application Data

(60) Provisional application No. 61/488,402, filed on May 20, 2011.

(51) Int. Cl.
*H01M 10/0562* (2010.01)
*H01M 4/04* (2006.01)
(Continued)

(52) U.S. Cl.
CPC .............. *H01M 4/04* (2013.01); *B82Y 30/00* (2013.01); *H01M 4/60* (2013.01); *H01M 4/64* (2013.01); *H01M 4/66* (2013.01);
(Continued)

(58) Field of Classification Search
CPC ........ H01M 4/131; H01M 4/134; H01M 4/36;
H01M 4/623; H01M 10/0525; H01M 4/364;
H01M 4/02; H01M 2004/021; H01M 2004/027; Y02E 60/122
USPC .............. 429/314, 311, 218.1, 313, 316, 322, 429/327; 29/623.1, 623.5
See application file for complete search history.

(56) References Cited

U.S. PATENT DOCUMENTS

| | | | |
|---|---|---|---|
| 6,727,343 B2 | 4/2004 | Morris et al. | |
| 7,045,248 B2 | 5/2006 | Bannai et al. | |

(Continued)

FOREIGN PATENT DOCUMENTS

| | | |
|---|---|---|
| WO | 0129919 | 4/2001 |
| WO | 02097941 | 12/2002 |

(Continued)

OTHER PUBLICATIONS

Blackburn et al., "Synthesis and Characterization of Boron-Doped Single-Wall Carbon Nanotubes Produced by the Laser Vaporization Technique", Chemistry of Materials, 2006, vol. 18, No. 10, pp. 2558-2566.

(Continued)

*Primary Examiner* — Gary Harris
(74) *Attorney, Agent, or Firm* — John C. Stolpa; Michael A. McIntyre

(57) ABSTRACT

Hybrid radical energy storage devices, such as batteries or electrochemical devices, and methods of use and making are disclosed. Also described herein are electrodes and electrolytes useful in energy storage devices, for example, radical polymer cathode materials and electrolytes for use in organic radical batteries.

13 Claims, 10 Drawing Sheets aminoxy anion (n-type doped state)  nitroxide radical  oxaammonium cation (p-type doped state)

(51) Int. Cl.
*B82Y 30/00* (2011.01)
*H01M 4/60* (2006.01)
*H01M 4/64* (2006.01)
*H01M 4/66* (2006.01)
*H01M 10/0565* (2010.01)

(52) U.S. Cl.
CPC ..... *H01M 10/0562* (2013.01); *H01M 10/0565* (2013.01); *Y10S 977/742* (2013.01); *Y10S 977/734* (2013.01); *Y10S 977/773* (2013.01); *Y10S 977/81* (2013.01); *Y10S 977/811* (2013.01)
USPC ........... 429/314; 429/213; 429/211; 429/304; 429/200; 429/201; 977/742; 977/734; 977/773; 977/810; 977/811; 427/58

(56) References Cited

U.S. PATENT DOCUMENTS

| | | | |
|---|---|---|---|
| 7,544,441 | B2 | 6/2009 | Iwasa et al. |
| 7,642,011 | B2 | 1/2010 | Nakahara et al. |
| 2005/0026037 | A1* | 2/2005 | Riley et al. .................... 429/210 |
| 2005/0181282 | A1 | 8/2005 | Niu |
| 2006/0003229 | A1 | 1/2006 | Sai-Cheong et al. |
| 2008/0299460 | A1 | 12/2008 | Feng et al. |
| 2009/0011336 | A1 | 1/2009 | Inoue et al. |
| 2010/0255372 | A1* | 10/2010 | Suguro et al. ................. 429/213 |
| 2011/0136017 | A1* | 6/2011 | Singh et al. ................... 429/311 |

FOREIGN PATENT DOCUMENTS

| | | |
|---|---|---|
| WO | 2004040675 | 5/2004 |
| WO | 2005022666 | 3/2005 |
| WO | WO 2007141913 A1 * | 12/2007 |

OTHER PUBLICATIONS

Bobbitt et al., "Organic Nitrosonium Salts as Oxidants in Organic Chemistry", Heterocycles, 1988, vol. 27, No. 2, pp. 509-533.

Bundgaard et al., "Low band gap polymers for organic photovoltaics", Solar Energy Materials and Solar Cells, Jul. 6, 2007, vol. 91, No. 11, pp. 954-985.

Dai et al., "A Sodium Ion Based Organic Radical Battery", Electrochemical and Solid-State Letters, 2010, vol. 13, No. 3, pp. A22-A24.

Dileo et al., "Enhanced Capacity and Rate Capability of Carbon Nanotube Based Anodes with Titanium Contacts for Lithium Ion Batteries", ACS Nano, 2010, vol. 4, No. 10, pp. 6121-6131.

Fukuzaki et al., "Room-Temperature high-spin organic single molecule: Nanometer-sized and hyperbranched poly [1,2,4(4)-phenylenevinyleneanisylaminium]", Journal of the American Chemical Society, 2006, vol. 128, No. 3, pp. 996-1001.

Hadjichristidis et al., "Polymers with Complex Architecture by Living Anionic Polymerization", Chemical Reviews, 2001, vol. 101, pp. 3747-3792.

Li et al., "Polymerization of Phenylacetylene Catalyzed by Diphosphinopalladium(II) Complexes", Macromolecules, vol. 35, No. 12, pp. 4573-4576.

Nakahara et al., "Rechargeable batteries with organic radical cathodes", Chemical Physics Letters, Jun. 2002, vol. 359, Nos. 5-6, pp. 351-354.

Nishide et al., "Organic radical battery: Nitroxide polymers as a cathode-active material", Electochimica Acta, Nov. 30, 2004, vol. 50., Nos. 2-3, pp. 827-831.

Nishide et al., "Organic Radical Battery", The Electrochemical Society Interface, Winter 2005, vol. 14, No. 4, pp. 32-36.

Nishide et al., "Environmentally benign batteries based on organic radical polymers", Pure and Applied Chemistry, 2009, vol. 81, No. 11, pp. 1961-1970.

Schrock et al., "π-Bonded complexes of the tetraphenylborate ion with rhodium(I) and indium(I)", Inorganic Chemistry, 1970, vol. 9, No. 10, pp. 2339-2343.

Sen et al., "B—C—N, C—N and B—N nanotubes produced by the pyrolysis of precursor molecules over Co catalysts", Chemical Physics Letters, 1998, vol. 287, pp. 671-676.

Shukla et al., "Materials for next-generation lithium batteries", Current Science, Feb. 10, 2008, vol. 94, No. 3, pp. 314-331.

Suga et al., "Cathode- and Anode-Active Poly(nitroxylstyrene)s for Rechargeable Batteries: p- and n- Type Redox Switching via Substituent Effects", Macromolecules, 2007, vol. 40, pp. 3167-3173.

Terrones et al., "Pyrolytically grown $B_xC_yN_z$ nanomaterials: nanofibres and nanotubes", Chemical Physics Letters, Aug. 1996, vol. 257, Nos. 5-6, pp. 576-582.

Yu et al., "Semiconducting boron carbonitride nanostructures: Nanotubes and nanofibers", Applied Physics Letters, 2000, vol. 77, No. 13, pp. 1949-1951.

Yu et al., "Highly oriented rich boron B—C—N nanotubes by bias-assisted hot filament chemical vapor deposition", Chemical Physics Letters, Jun. 23, 2000, vol. 323, pp. 529-533.

* cited by examiner

A.

B.

A.

B.

aminoxy anion
(n-type doped state)

nitroxide radical oxaammonium cation
(p-type doped state)

(i) catalyst: Rh(COD)BPh₄ or (dippf)PdCl(CH3)

HYBRID RADICAL ENERGY STORAGE DEVICE AND METHOD OF MAKING

CROSS-REFERENCE TO RELATED APPLICATIONS

This application claims priority to U.S. Provisional Application No. 61/488,402, filed May 20, 2011, the contents of which are incorporated by reference in their entirety.

CONTRACTUAL ORIGIN

The United States Government has rights in this invention under Contract No. DE-AC36-080028308 between the United States Department of Energy and Alliance for Sustainable Energy, LLC, the Manager and Operator of the National Renewable Energy Laboratory.

BACKGROUND

In order to provide a cost effective, environmentally benign and efficient means for storing electric energy from renewable sources, breakthroughs are needed in rechargeable battery technology that will substantially increase energy and power densities. Practical deployment of the batteries for transportation also requires them to be of low cost and safe.

Organic radical batteries, ORBs, are a relatively new class of rechargeable batteries that are based on the utilization of stable organic radical molecular/polymer compounds as the cathode electrode within a high performance battery. The radical polymer electrodes can contain densely populated unpaired electrons in the pendant radical groups that are chemically stabilized via steric and/or pre-designed resonance effects. These stabilized radical systems are characterized by very fast electron-transfer processes that are the basis for the efficient performance of these systems in secondary batteries. These radical polymers are utilized as alternatives to inorganic metal-oxide or sulfur based materials as the primary cathode in the battery.

ORBs have several advantages over conventional batteries. ORBs are safer than conventional inorganic batteries because they are non-flammable, adaptable to wet fabrication processes, easily disposable, flexible and can be fabricated via "green" chemical processes. These high energy, safe, stable and "greener" systems also have extraordinary cycle life. The ORB is capable of several thousand deep (>80%) charging and discharging cycles at high rates/loads at full utilization of the capacity without performance loss (within 90% of initial performance). However, the major limitation for this technology is that the current charge storage capacity and specific energy of the present-day ORB is significantly lower than that of a conventional Li-ion battery.

The capacity of the most common ORB cathode active material is 110-130 mAh/g, which is less than the capacity of current cathode materials (150-170 mAh/g) in conventional Li-ion batteries. Therefore, there is a need for the design of and synthesis of new polymeric compounds with higher radical concentrations in order to significantly improve capacity and to make ORBS viable competitor for existing technologies. If achieved, ORBs will have an impact on technology and business from personal electronics to automobile to remote energy storage systems.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

A hybrid solid-state electrochemical device is provided such as an energy storage/discharge device (e.g., a lithium-ion battery or the like) or an electrochromic device (e.g., smart window). The device may include an anode composed of a pre-lithiated nanostructured material, a cathode composed of a stable polymeric organic radical-based material, an electrolyte composed of a high performance solid-state polymer; and optional anode and cathode current collectors.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
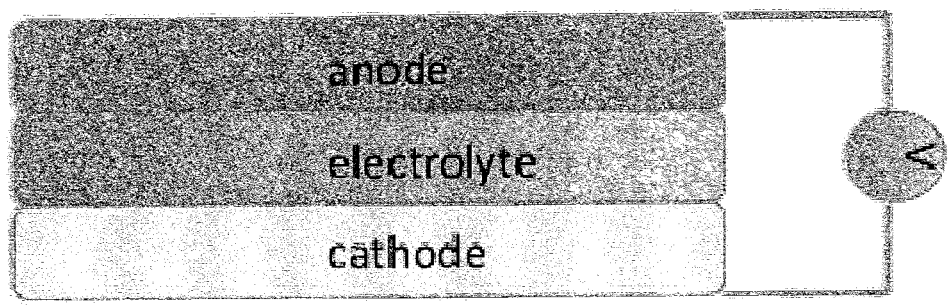
FIG. 1 illustrates in simplified form an electrochemical device such as a battery, as described herein.

The following description is directed toward a hybrid radical energy storage device, such as a battery or electrochemical device, and methods of making. The devices described include batteries based on either a Li-ion battery technology or a Mg-ion battery technology. The basic structure of an organic radical battery (ORB) is depicted in FIG. 1. Also described herein are electrodes and electrolytes useful in energy storage devices. For example, radical polymer cathode materials and electrolytes for use in organic radical batteries are disclosed herein.

Exemplary embodiments described herein include a battery system comprising a stable polymeric organic radical-based cathode, a pre-lithiated nanostructured anode, and a high performance solid-state polymer electrolyte. The batteries may also include a cathode and an anode current collector, which each may comprise aluminum, gold, copper, stainless steel or other refractory metals. The layers of the structure may be deposited upon a substrate and/or constructed by depositing each layer upon the previous layer as is conventional in battery fabrication. And in yet another embodiment, a conductive plastic substrate could be used as the current collector in such a manner to make a flexible energy storage device. The devices may also comprise a flexible plastic substrate with a conductive surface coating of metal, metal oxides, metal nitrides, or metal sulfides or a conductive non-metal surface coating. Additional flexible substrates suitable for use include non-plastic based materials such as cellulose, paper, rubber, and the like.

The components allow for a flexible, inexpensive, high performance, electron based battery system as opposed to a conventional intercalation-based battery. The radical system can enable a safe, durable, "green" prototypical battery with a projected 2.8-3.5 volt cell that delivers about 560-800 Whr/kg and a range of 600-700 Wh/liter at C/3. In certain embodiments, the devices exhibit voltages of at least 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, or 3.8 volts.

The batteries herein have minimal temperature effects and the minimal flammability can mitigate castrophic failure during abusive charging/discharging processes. Even at abusive C-rates, cell performance is expected to be within 90% of initial after about 1000 cycles. Batteries with novel lightweight organic radical electrodes can be used in battery-powered plug-in hybrid-electric vehicles (PHEVs) and potentially baseload storage.

In one exemplary embodiment, the cathode comprises a stable polymeric organic radical-based cathode. In general, any p-type, electrode-active polymer may be used to produce the cathode. Examples include polymers based on nitroxide derivatives, radical-containing acrylamides, and derivatives of polyaromatics, polystyrenes, polyacetylenes, and heteroaromatics, certain embodiments of which are described in the Examples below. Typically, a greater number of unpaired electrons in the polymer correlates with better performance as a cathode.

Figure 2:
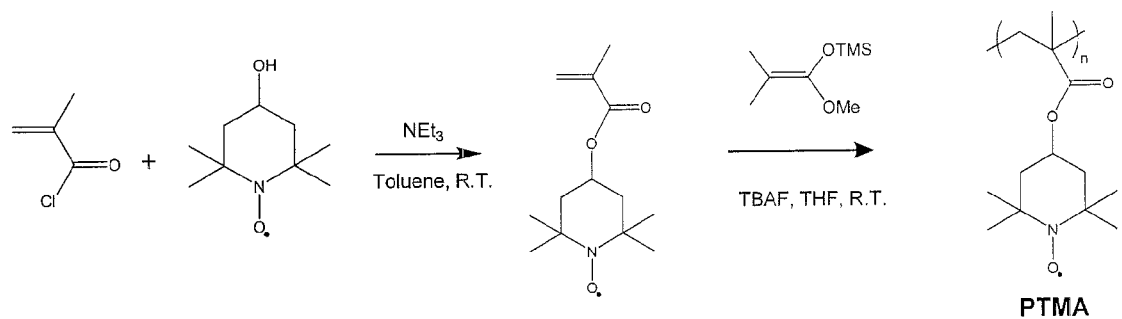
FIG. 2 illustrates the polymerization of PTMA and PNSty to form nitroxide-radical based cathode materials.
Figure 2:
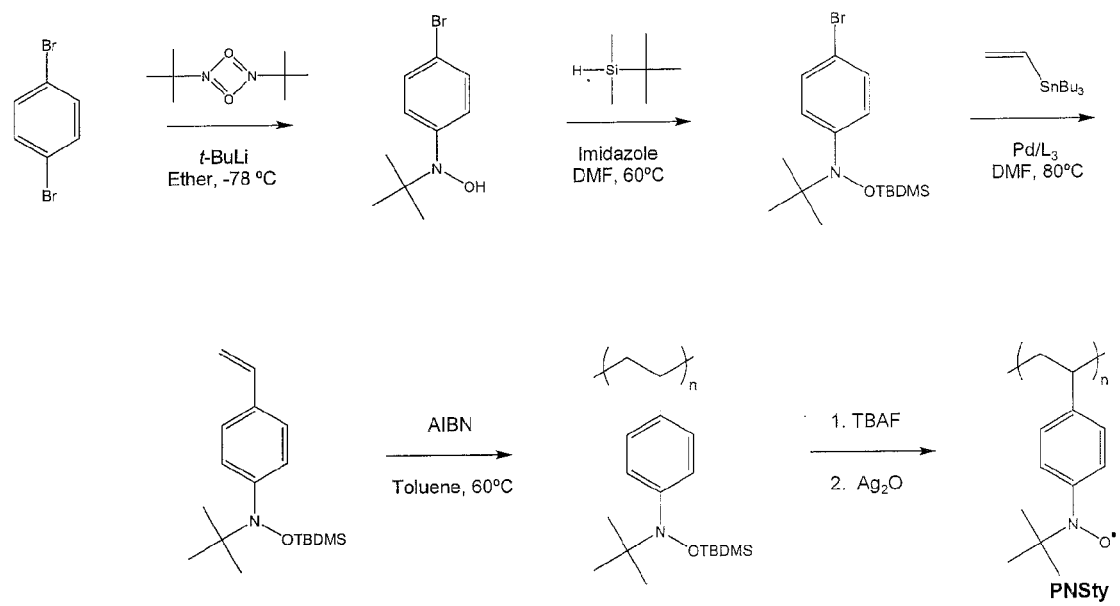

Cathodes may be formed by the polymerization of a nitroxide radical. In some cases, as shown in FIG. 2, the nitroxide radical may be a methacrylate-based nitroxide radical polymer such as poly(4-methacryloyloxy-2,2,6,6-tetramethylpiperidine-N-oxyl) (PTMA) or a styrene-based nitroxide radical polymer such as poly[4-(N-t-butyl-N-oxylamino)styrene] (PNSty). The PTMA polymer contains 2,2,6,6-tetramethylpiperidinyl-N-oxy (TEMPO), which is chemically robust as well as rapidly, reversibly, and stoichiometrically oxidized to the corresponding oxoammonium cation, or p-type doped state, via a chemical or electrochemical oxidation pathway. In certain embodiments the polymer is cross-linked.

Polymer-based, electrode active materials inherently possess several advantages. In addition to being lightweight, they have tunable redox properties, possess mechanical flexibility, and are compatible with extrusion processing techniques. Due to their sufficient solubility in common organic solvents like tetrahydrofuran (THF) or chlorobenzene, polymer-based electrodes can also be readily processed using coating techniques, which are commonly employed in the manufacturing of bulk heterojunction OPV materials. These cathodes must also be insoluble in the battery electrode. Exemplary syntheses schemes include PTMA, PNSty, radical-containing acrylamides, controlled anionic polymerization of nitroxyolefins, metal catalyzed polymerization of acetylenes, and metal catalyzed polymerization of heteroaromatic nitroxides. In some embodiments, the cathode materials are attached to submicron structures such as silicon spheres, silicon rods, Titanium oxide rods, and the like.

In some cases, the cathode may include a mixture of organic radicals, inorganic carbon composite materials, magnesium sulfides, magnesium oxides and any combinations thereof. In some embodiments the cathode polymers reach a capacity of at least 200 mAh/g, or in a range between 111 mAh/g to 140 mAh/g. In some cases, the cathode polymers may be formed with various polymerization techniques, including but not limited to anionic polymerization, rhodium catalyzed polymerization techniques, palladium catalyzed polymerizations, or other types of step growth polymerization Anode suitable for use in the devices herein may be any based on lithium ion or magnesium ion chemistries. Anodes may be, for example, metallic magnesium or lithium, an alloy of magnesium or lithium, magnesium- or lithium-based compounds, or compounds mixed with magnesium or lithium. In addition to lithium anodes known to those in the art, exemplary lithium anodes include lithiated, carbon based anodes such as a lithiated, boron-doped carbon-based anode. Likewise, exemplary magnesium anodes include magnesium-doped carbon that may be further doped with boron.

In one example, the anode may exist in a nanostructured form. For example, the anode may take the form of a nanostructured inorganic radical based on nanostructured carbon. In some cases, the anode is made of a heterogeneous carbon-based anode material for improved cell voltage stability. In some embodiments, the nanomaterial may be doped or undoped nanotubes (e.g., single walled nanotubes (SWNTs), double-wall nanotubes, multi-wall nanotubes, or the like), fullerenes, microbeads such as mesocarbon microbeads. The anode may be composed of carbon nanotubes (such as single-wall, double-wall, and/or multi-wall nanotubes), carbon fibers, fullerenes, graphene, and/or any carbon based nanostructured material, including doped carbon nanostructures, e.g., boron or nitrogen-doped nanotubes and/or BCN nanostructures (e.g., any hybrid nanotubes constructed of boron (B), carbon (C), and/or nitrogen (N) elements or other nanostructures of the so-called BCN material system) or the like. Other high-surface area carbon-based materials such as carbon-based aerogels three-dimensional scaffolds, templated growth carbons, pre-defined pore structure carbon matrices, etc., may also be included. In some embodiments, the boron dopants may include boron trichloride and diborane and combinations thereof.

As an alternative to lithium, the anode material may also be magnesium based, magnesium-doped carbon, magnesium metal, a magnesium allow, magnesium-carbon mixture, magnesium oxide complex, magnesium oxide/carbon mixture, a combination of organic radicals and metallic nanostructures, a combination of organic radical and semiconducting metal oxide nanostructures, a combination of nanostructured carbon materials and magnesium/magnesium oxide. In some cases, conjugated polymers such as polyaromatic or polyacetylene derivatives can augment the conductivity of the anode and eliminate the demand for large quantities of carbon filler materials, which otherwise may need to be doped. In one embodiment, the ORB cathode material necessitates the use of a filler material, such as well-separated non-bundled, all-carbon nanotube materials. In some cases, because of dispersion efficiency and effective percolation, when using SWNTs the need for current collectors may be minimized and the SWNTs act as a binder to improve electrode structural integrity.

Figure 3:
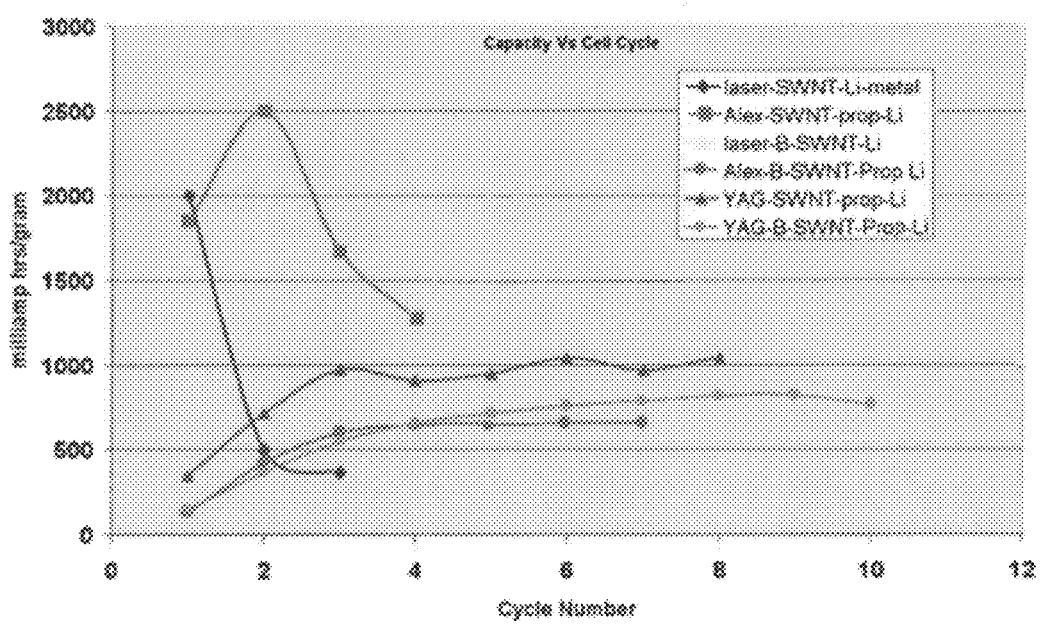
FIG. 3a is an illustration of the improved performance of the capacity vs. cell cycle of carbon nanotube and boron-doped carbon nanotube radical anodes.
FIG. 3b is a plot graph of cell potential vs. time of carbon nanotube based radical anodes.
Figure 3:
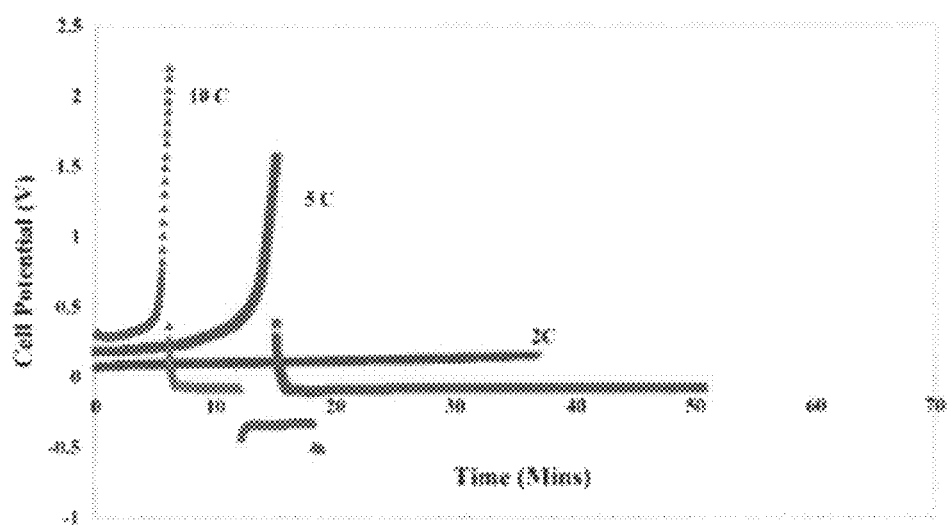

FIG. 3a, illustrates the improved performance of carbon nanotube and boron-doped carbon nanotube radical anodes prelithiated electrochemically. Results illustrate unusual stability and lack of performance loss (hysteresis) for the radical materials formed from prelithiation from a metal oxide versus electrode exposure to lithium metal. FIG. 3b illustrates the TRL-6 protypical 14 cm$^2$ pouch battery demonstration of the anode, via a typical cycle for a rocking-chair test cell that was assembled using the pre-lithiated B-doped SWNT material as the anode and carbon-SWNT as the cathode. The standard 1M LiIM in 50:50 EC:EMC served as the electrolyte. This figure is of cycle 5 for the 14 cm$^2$ test cell with a charge/discharge @ 500 microamps with an almost flat discharge of ~2.3 vols for 3 hours. Therefore, based on electrode mass, this cell performed at an average specific energy of >700 Wh/kg for more than 36 cycles at a rate of C/5, before it was stopped for analysis of electrodes. Interestingly, unlike most other carbon based materials, the B-doped SWNT materials also demonstrate the ability to achieve extremely fast discharge rates without significant loss in performance with a performance of 800 mamp hr/g for C/5 to 650 mamp hr/g for 2 C to 325 mamp hr/g for 10 C-rate. In some cases performance of a 14 cm$^2$ pouch battery roacking chair battery with a prelithiated B-Doped radical nanotube cathode and an undoped purified SWNT cathode was stable to >90% for 30 cycles. In some examples the doped nanotubes are synthesized by arc discharge (AD), laser vaporization (LV), or chemical vapor decomposition methods (CVD)

The electrolyte material will vary with the chemistry of the anode. For example, a lithium-based anode is paired with a lithium-based electrolyte and a magnesium-based anode is paired with a magnesium-based electrolyte. Suitable forms for the electrolyte include solid-state polymers, ionic liquids or typical solvent based electrolytes, or gels.

Exemplary lithium electrolyte solutions are known in the art and may comprise, for example, $LiPF_6$, $LiBF_4$ or $LiClO_4$. Electrolyte layers may be made of a material selected from the group consisting of: lithium silicates, lithium borates, lithium aluminates, lithium phosphates, lithium phosphorus oxynitrides, lithium silicosulfides, lithium borosulfides, lithium aluminosulfides, and lithium phosphosulfides, glass, ceramics, $Li_3N$, $LiF_3$, $LiAlF_4$, solid polymeric lithium-ion-conducting electrolyte materials selected from the group consisting of polyethers, polyimines, polythioethers, polyphosphazenes, polyalkylene oxides, and polymer blends, mixtures, and copolymers thereof. Liquid electrolytes in lithium-ion batteries may consist of lithium salts, such as $LiPF_6$, $LiBF_4$ or $LiClO_4$ in an organic solvent, such as ethylene carbonate, dimethyl carbonate, and diethyl carbonate.

Exemplary magnesium electrolyte solutions may comprise $Mg(AlCl_2RR')_2$ complexes (wherein R and R' are independently alkyl groups such as methyl-, ethyl-, butyl-, etc., or aromatic groups such as phenyl-, etc.) dissolved in, for example, ethers, ionic liquids such as N-methyl-N-propylpiperidinium bistrifluoromethanesulfonylimide; N,N-diethyl-N-methyl-N-(2-methoxyethyl)ammonium (DEME+) with mixed anion of bis(trifluoromethanesulfonyl)imide (TFSI−) and bis(fluorosulfonyl)imide (FSI−); Trihexyl(tetradecyl) phosphonium chloride; 1M $Mg(CF_3SO_3)_2$/THF, or any combination thereof, as well as a solid-state ion conductive systems.

Figure 4:
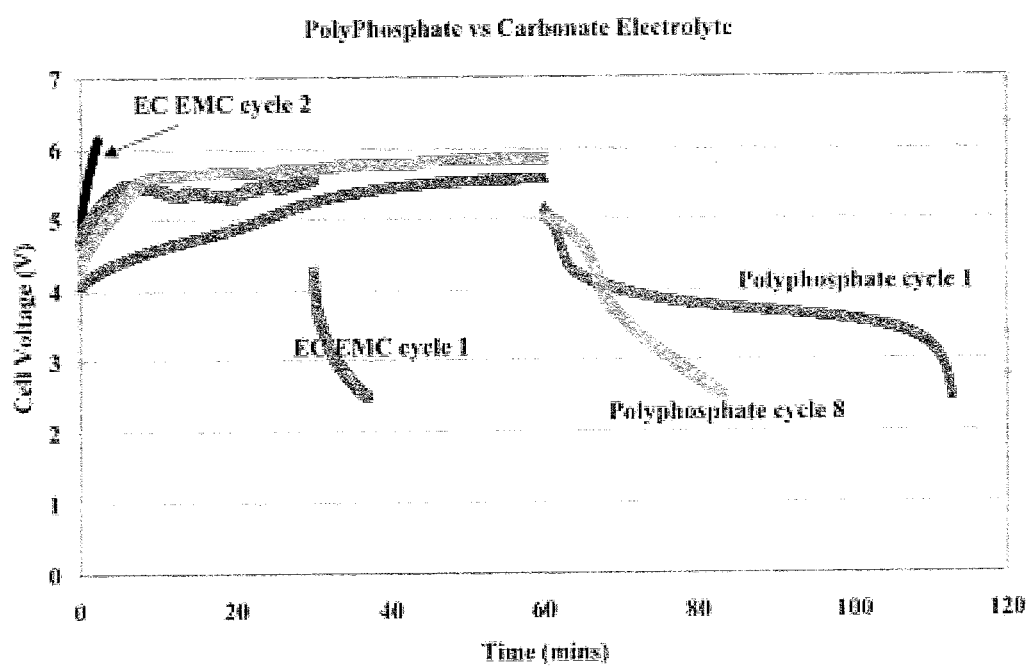
FIG. 4 shows stability test results of a phosphate based electrolyte as compared to typical carbonates.

Polymers may be combined with magnesium or lithium electrolytes to form solid state electrolytes. Exemplary solid state electrolytes that may be utilized include polymers contains alternating electronegative group III-VI elements connected with hydrocarbon or fluorocarbon linkages to form a polyalkyl or polyfluoroalkyl heteroatomic polymer. In some instances, the polymers are phosphate-based polymers. Examples of these are disclosed in U.S. Pat. No. 6,727,343. In some cases, the phosphate-based material may exhibit a conductivity of up to at least $10^{-3}$ S/cm at 25° C., and at temperatures from −10 to 60° C. without any significant performance change. Solid phase electrolyte such as these may exhibit exceptional thermodynamic stability even in the presence of metallic lithium. The electrolyte materials may also exhibit a wide electrochemical window range of −200 mV to ~+6V vs LULL For example, FIG. 4 shows a polyphosphate electrolyte tested against a standard EC:EMC (1M LiIm) electrolyte using MCMB treated anodes and standard $LiNiCoO_2$ cathodes. Each cell was charged at 7 C and discharged at 3 C. Each cell polarized to >5 V, the carbonate electrolyte decomposed by the second cycle whereas the polyphosphate electrolyte supported many more cycles retaining >80% of the cell capacity by cycle 8.

In one embodiment, a method of making an organic radical cathode, the cathode may be slurry cast onto a carbon coated aluminum current collector. A layer of solid state electrolyte will be deposited on the cathode surface with a slurry printing process. After drying and compression, a nanotube paper anode will be added to complete the cell sandwich.

In another embodiment, weighed electrolyte materials are cold pressed at 8 metric tons. In the same die, composite cathode powders composed of the organic radical, un-doped carbon nanotubes and solid electrolyte will be pressed onto one side of the electrolyte layer to form a monolith. Finally, the radical B-doped nanotube paper anode is pressed to the other side of the pellet at 8 metric ton to serve as negative electrode. The entire sandwich structure will then be released and placed into a coin cell casing and sealed to form a complete cell. In some cases, the quality of the sandwich will be characterized by cross section Scanning Electron Microscopy, SEM. In some cases, the nanotube material can be processed via traditional paper technologies, and the cathode and electrolyte are both polymer systems, therefore the manufacturing process for this system can be a high throughput process that utilizes roll-to-roll, surface coating and/or stamping techniques.

The batteries described here may be used for applications where a small power source is needed, such as portable consumer electronic devices, electrical grids, electric vehicles, operating devices such as implantable medical devices, remote sensors, miniature transmitters, smart cards, and microelectronic devices. Such batteries may also be useful for various military and aerospace applications.

EXAMPLES

Example 1

The following Example describes potential synthesis routes for ORB cathodes.

Figure 5:
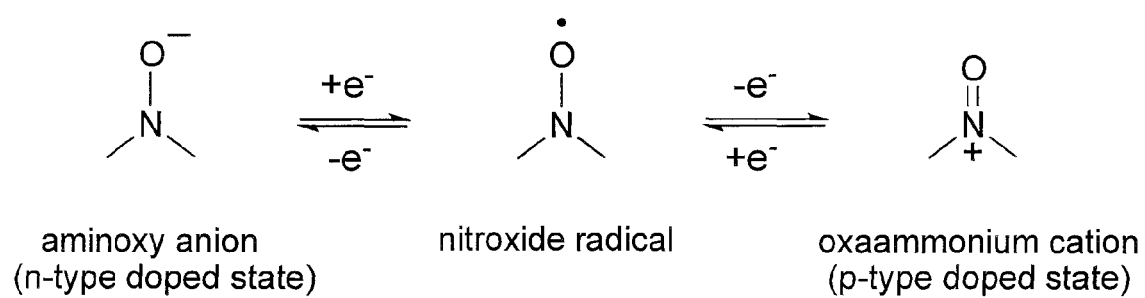
FIG. 5 shows redox couples of a nitroxide derivative.

A fully reversible one-electron oxidation of nitroxides that leads to the formation of an oxoammonium cation (FIG. 5) enables their use as a cathode material in ORBs. The polymer poly(2,2,6,6-tetramethylpiperidinyloxy-4-yl methacrylate) (PTMA) contains 2,2,6,6-tetramethylpiperidinyl-N-oxy (TEMPO), which is chemically robust as well as rapidly, reversibly, and stoichiometrically oxidized to the corresponding oxoammonium cation, or p-type doped state, via a chemical or electrochemical oxidation pathway. The alkyl substituents near the nitroxo function influence the stability of the radical as they shield the unpaired electron on the oxygen atom from unwanted interactions.

Polymer-based, electrode-active materials inherently possess several advantages. In addition to being lightweight, they have tunable redox properties, possess mechanical flexibility, and are compatible with extrusion processing techniques. Due to their sufficient solubility in common organic solvents like THF or chlorobenzene, polymer-based electrodes can also be readily processed using coating techniques, which are commonly employed in the manufacturing of bulk heterojunction (BHJ) OPV materials. As both the nitroxide and the corresponding oxoammonium salt must be prevented from migrating to the negative anode, they must be insoluble in the battery electrolyte. This requirement is currently best satisfied by attaching nitroxide functions to a polymer backbone.

High charge/discharge capacity and high energy density are not only important characteristics of successful organic radical polymer batteries comprising nitroxide radicals, but may also present limitations. For example, although the rate capability and cycle stability of PTMA material is excellent, it exhibits a rather low energy density (112 mAh/g), compared to >150 mAh/g for transition metal oxide-based cathode materials (150-170 mAh/g) in conventional Li-ion batteries. Therefore it is useful to increase the energy density of radical batteries either via increasing the number of radical centers per weight unit and/or by increasing the cell voltage by using radicals with more positive oxidation potentials. One synthetic routes involves the anionic polymerization of 4-methacryloyloxy-2,2,6,6-tetramethylpiperidine-N-oxyl and its derivatives in the presence of catalytic quantities of alkyl lithium derivatives, like 1,1-diphenyl-3-methylpentyl-lithium (DPMPLi) as an initiator. The living character of anionic polymerization provides an ability to produce polymers with controlled molecular weight and narrow molecular weight distribution, as measured by polydispersity index ($PDI=M_w/M_n$), and to extend chains with different monomers to obtain multi-block copolymers. That molecular weight and molecular weight distribution can have an effect on the performance of the polymer based OPV devices; therefore, PDI may alter the performance of polymeric cathodes, in particular those made of conjugated polymers.

Figure 6:
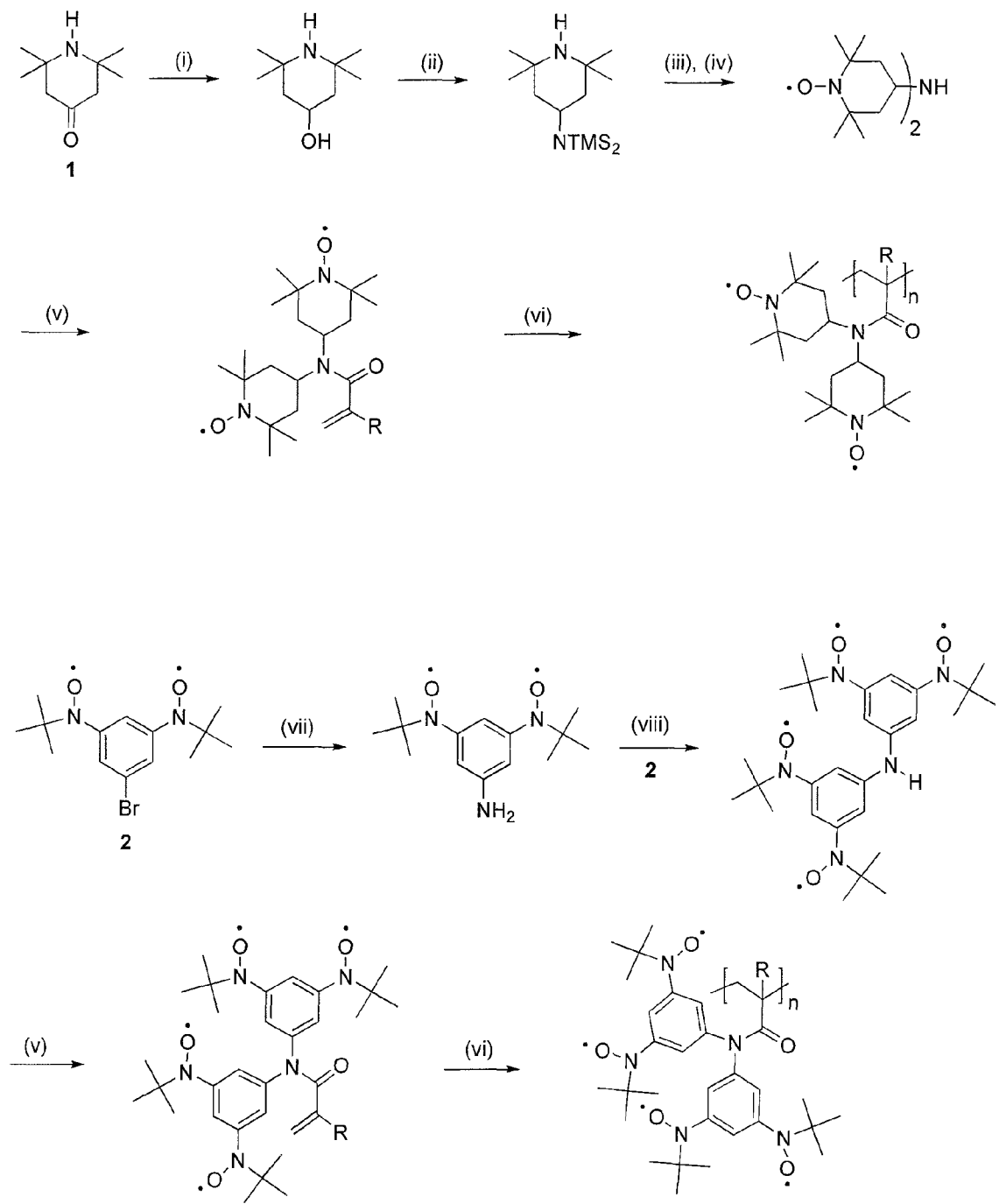
FIG. 6 shows a synthetic pathway for the polymerization of radical-containing acrylamides.

N,N-bis-2,2,6,6-tetramethylpiperidinyl-N-oxy substituted methacrylamide (FIG. 6) can be utilized as a monomer to prepare compact polymeric structures with a significantly higher density of radical centers per weight unit then PTMA, therefore driving the energy capacity of ORB above 200 mAh/g. The generic synthetic pathway and structures of N,N-bis-substituted polymethacrylamide and polyacrylamide are depicted in FIG. 6. There are several possible approaches to the synthesis of the final polymer, and an alternative synthesis involves the polymerization of trismethylsilyl-protected nitroxide monomer followed by deprotection and oxidation of hydroxylamine-containing polymer to nitoxide. This approach is very suitable for controlled radical polymerization process such as atom transfer radical polymerization (ATRP) or reversible addition-fragmentation chain transfer (RAFT). Each method yields polymers with controlled molecular weights with a narrow molecular weight distribution.

Figure 7:
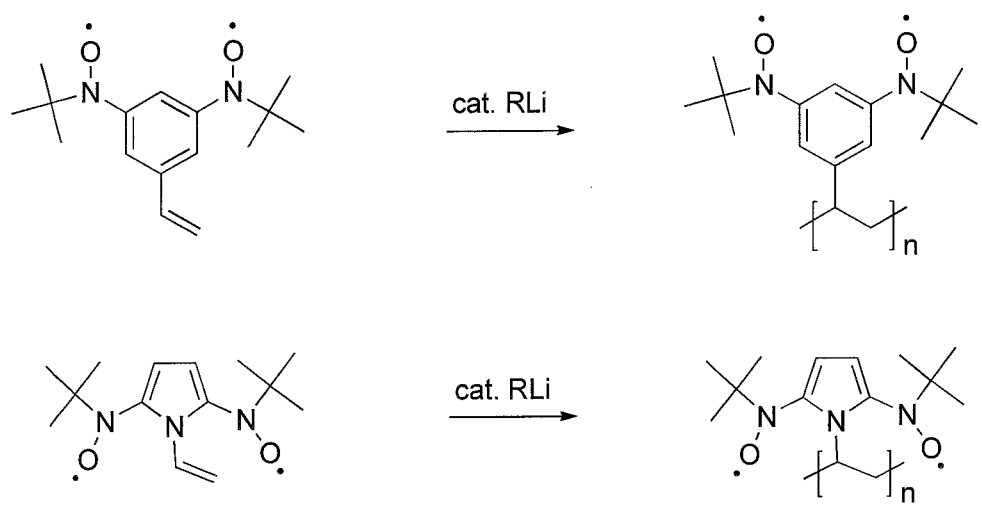
FIG. 7 illustrates a synthetic pathway for the anionic polymerization of nitroxylolefins.

Other nitroxide radical-containing structures with a high density of radical centers potentially benefiting from anionic polymerization are polystyrene derivatives represented in FIG. 7.

Figure 8:
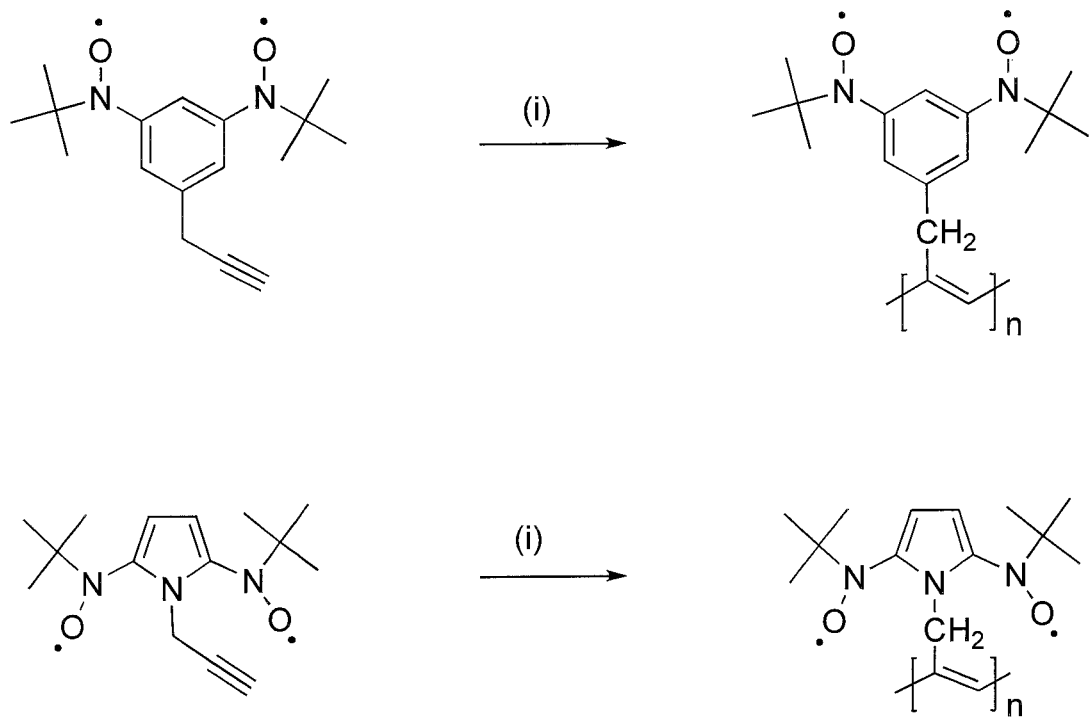
FIG. 8 shows a synthetic pathway for the metal catalyzed polymerization of acetylenes.
Figure 9:
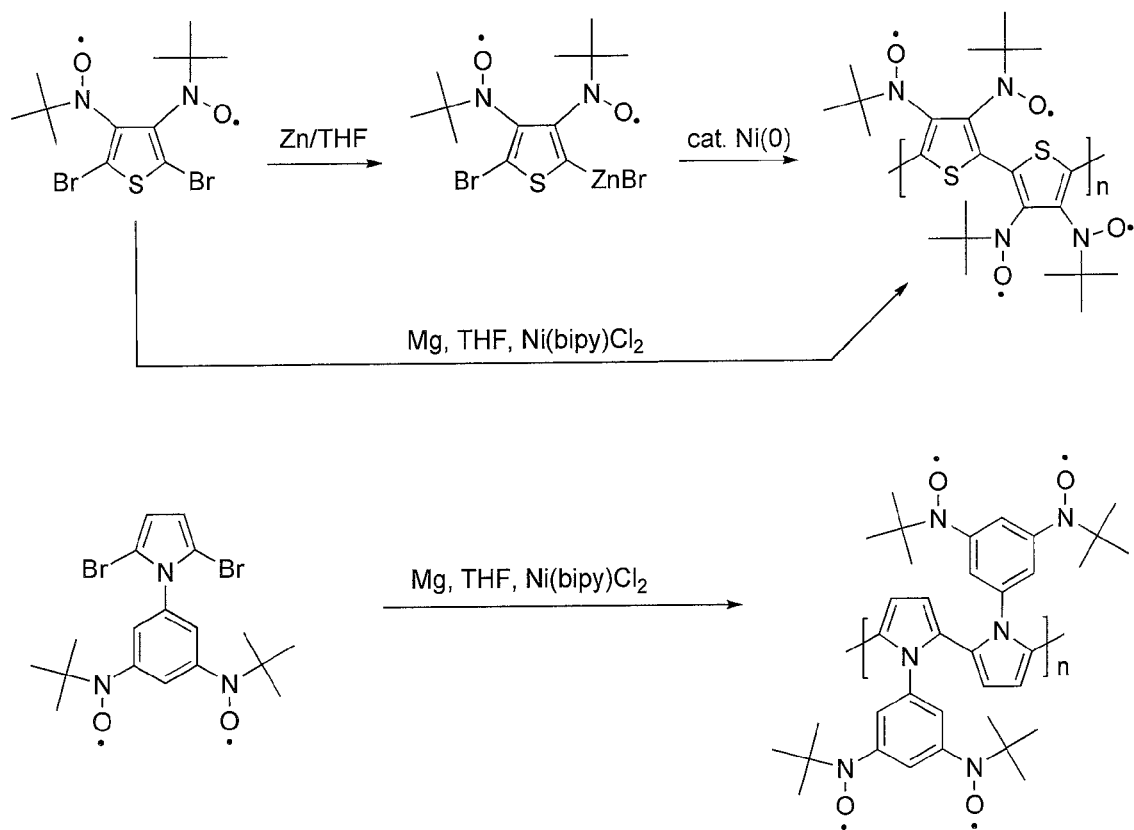
FIG. 9 shows a synthetic pathway for the metal catalyzed polymerization of heteroaromatic nitroxides.

Since the conductivity of the non-conjugated PTMA necessitates the use of conducting filler material, conjugated polymers such as polyaromatic or polyacetylene derivatives (FIG. 8) promise to augment conductivity of the cathode and eliminate the demand for large quantities of carbon filler materials, which otherwise need to be doped at the percolation limit for the non-conducting polymer cathode. Based on theoretical calculations performed on nitroxide radical-containing polyacetylenes, the reversibility of the redox process is not compromised by connecting the radical to a conjugated vinyl backbone. Such polymers appear to be great candidates for an electron-conducting cathode. Conjugated polymers based on polyacetylenes (FIG. 8) and heteroaromatic derivatives (FIG. 9) may be synthesized using generally established methods described in the literature, with emphasis on transition metal catalyzed polymerization-coupling reactions.

Example 2

The following Example describes the synthesis and characterization of a methacrylate-based and a styrene-based nitroxide radical polymer.

The methacrylate-based nitroxide radical polymer PTMA exhibits a theoretical capacity of 111 mAh/g while the styrene-based nitroxide radical polymer PNSty has a theoretical capacity of 140 mAh/g. The synthetic schemes for these polymers are depicted in FIG. 2.

The synthesis of PTMA monomer is made in one step from reaction of an acid chloride with 4-hydroxy TEMPO. The polymerization mechanism utilizes a tetrabutylammonium fluoride catalyst that cleaves the silyloxy group of the initiator, which in turn generates a reactive anionic species that initiates the polymerization. The polymer is washed and dried under vacuum. However, the material obtained was quite soluble in propylene carbonate. A cross-linked sample of PTMA was then synthesized using 4 mol % of an ethylene glycol dimethacrylate cross-linker following the procedure of Bugnon et al., *Chem. Mater.,* 2007, 19, 2910. This provided an insoluble material suitable for study in galvanostatic cycling experiments in a half-cell setup.

The three step monomer synthesis for PNSty proceeded as reported in Suga et al., *Macromolecules,* 2007, 40, 3167. Namely, a free radical polymerization of the protected monomer at 75° C. produced a polymer with $M_n$~10,000 g/mol and polydispersity 1.5. After deprotection of the silyloxy group with tetrabutylammonium fluoride to form an N—(OH) group, and oxidation of this functionality with silver oxide to the nitroxyl radical, an orange-brown material was obtained (nitroxide radicals are typically bright orange). Because this material was partially soluble in propylene carbonate, a higher molecular weight was desired (as a cross-linked sample can't be de-protected). When polymerization was run at a lower temperature (60° C., which tends to keep the radical concentration lower and in turn the molecular weights higher), a polymer with $M_n$~20,000 g/mol and polydispersity 5 was obtained. After de-protection and oxidation, this polymer was washed with propylene carbonate (removing some orange material), leaving behind a high molecular weight brown polymer.

Both polymers were characterized using FT-IR and quantitative ESR measurements According to the FT-IR and ESR measurements, the cross-linked PTMA looked clean. The capacity of this material was measured as ~100 mAh/g, very near the theoretical value of 105 mAh/g for the cross-linked material.

PNSty, however, displayed a large signal in the IR spectrum around 3400 $cm^{-1}$, indicative of an —(OH) functionality, suggesting the high molecular weight material was not fully oxidized in the last step. This is very typical of high molecular weight polymers that fold in on themselves. This is also consistent with the material being brown vs. orange. The oxidation procedure was repeated at a higher temperature (60° C. vs. R.T.) for an additional 48 hrs (vs. the initial 15 hrs), but no additional oxidation to generate the radical was seen.

Diffuse reflectance FTIR measurements were carried out with a Nexus 870 FTIR spectrometer. ESR measurements were performed on a Bruker Elexsys E-500 spectrometer operating at X-band (9.4 GHz) frequency. To determine the amount of radicals in the sample, the corresponding spectra were twice integrated and compared to a standard sample of known concentration, the Bruker Strong Pitch, with $1.2 \times 10^{17}$ spins/cm$^3$, or $3.3 \times 10^{16}$ spins actually inside the ESR cavity. GPC analysis of the polymers was performed on a PL-Gel 300×7.5 mm (5 μm) mixed D column using an Agilient 1200 series autosampler, inline degasser, and refractometer. The column and detector temperatures were 35° C. Chloroform was used as eluent (1 mL/min). Linear polystyrene standards were used for the calibration.

Example 3

The following Example describes a potential synthesis route for a phosphate electrolyte useful in ORBS.

Figure 10:
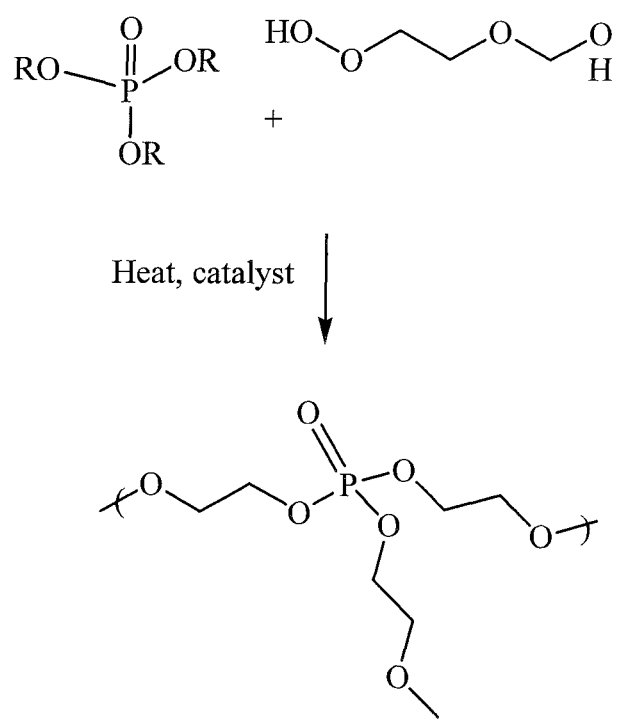
FIG. 10 shows a synthesis pathway for a polymer electrolyte.

Flame retardant polymer electrolytes offer an added measure of safety to high-energy battery systems. This solid phase electrolyte is a phosphorus-based material and as such exhibits exceptional thermodynamic stability even in the presence of metallic lithium. There are a number of synthetic route variations that can be employed to prepare the desired electrolytes. For example, a transesterification procedure can produce high yields of the desired product in a one-step facile procedure. FIG. 10 depicts the general synthesis process for the high performance electrolyte. Limiting the quantity of the diol reactant determines the degree of substitution of this moiety in the phosphate product. Additional details for the synthesis of these polymer electrolytes can be found in U.S. Pat. No. 6,727,343.

Selection of ethylene glycol mono-methyl ether (EGMME) [$H_3C$—O—$CH_2CH_2$—OH] as a reactant will lead to DMMMEP. Adding a stoichiometric excess of the EGMME will further functionalize the phosphate core with these ethylene oxide side chains. A series of formulations containing various degrees of ethylene oxide substitution may be generated to determine which provide optimum work function interface to a given electrode.

In general, the reactions are carried out in acetonitrile at about 100° C. using acid to catalyze the reaction (such as $H_2SO_4$, HCl or Nafion 117 pellets). The reactions are conducted under a blanket of inert gas to prevent air oxidation of the reactants and products. The reaction products are neutralized by suspending the mix in methanol and polyvinylpyridine (PVP). The neutralized products are then separated from the PVP via filtration and the residual methanol removed under vacuum. Individual purified electrolytes can be stored in screw cap vials until needed.

Following synthesis, the phosphate solvent products can be distilled using a vacuum band still to collect the various product fractions. These fractions may then be analyzed using gel permeation chromatography to determine their purity. NMR analysis of the various fractions can be used to ascertain the structure of the fraction.

Example 4

The following Example describes the production of boron-doped nanostructured carbon anodes.

High purity undoped and boron-doped single-walled carbon nanotubes (SWNTs) and multi-walled carbon nanotubes (MWNTs) by arc discharge (AD), laser vaporization (LV), or chemical vapor decomposition methods (CVD) can be generated. Many are still concerned about the cost of SWNT materials, but in recent years with the advent of highly efficient AD and CVD synthetic techniques, the cost of SWNTS is now in line with the mesocarbon microbeads (MCMB) used in SOA Li-ion batteries; consequently they are no longer the expense limitation in the cell. In the case of boron-doped nanotubes, solid-state and gas-phase dopants have been successfully utilized to incorporate boron substitutionally into the sp$^2$ carbon lattice. As an example, we have found that transition metal boride alloys are particularly good solid-state dopants for LV and AD production of boron-substituted SWNTs. The incorporation of NiB, Ni$_2$B, or Co$_3$B into graphite LV targets results in B substitution at levels up to ~2 atomic percent.

The particular method utilized to synthesize the boron-substituted carbon nanotubes will have a significant impact on the structure, boron incorporation level, and defect density of the nanotubes. For example, LV-produced B-SWNTs, typically contain B levels less than ~3%, but also have extremely low defect densities. In contrast, CVD production typically allows for higher levels of B incorporation, but B-SWNTs have been difficult to achieve. Instead, highly defective B-MWNTs with widely varying morphologies are typically produced by CVD reactions incorporating gas-phase boron dopants.

The boron doping level, defect density, and microstructure of the nanotubes influences the performance of batteries including boron-doped nanotubes as the anode material. CVD methods have shown success in producing high yields of randomly oriented MWNTs or aligned arrays and can be adapted to the incorporation of boron dopants, utilizing TEM, EELS, and Raman spectroscopy to characterize the resulting MWNTs.

Example 5

The following Example describes methods for the electrochemical assessment of the materials described herein.

The electrochemical assessment of the materials can include: half-cell chronopotentiometry, slow scan cyclic voltammetry, full-cell chronopotentiometry, and impedance spectroscopy. The stability of the electrode materials can be evaluated with an Electrochemical Mass Spectroscopy apparatus, where one can evaluate outgas components in real time. These techniques can be used to determine the stability of the materials under rigorous conditions, their relative charge transfer rate and some understanding of the electrode-ectrolyte interface. Also, using a standard test cell apparatus and a liquid electrolyte (1M lithium trifluoromethanesulfonimide [LiIm], 3M Co. in 50:50 ethylene carbonate:ethyl-methyl carbonate) together with a Celgard 2325 separator, the cell can be assembled and tested in an helium filled inert gas chamber box. The electrochemical measurements can be obtained using a multichannel electrochemical test instrument.

Newly designed and synthesized cathode materials can be tested for performance in a standard liquid electrolyte half-cell format as described above. The fundamental electrochemical processes surrounding radical formation in the ORB materials can be characterized using cyclic voltammetry. This method can be used to characterize radical formation both from a thermodynamic as well as electron transfer kinetics point of view. Potential cycling can also be used to understand the long-term stability of the materials.

Characterization of electrolyte materials can be conducted using standard electrochemical techniques, such as cyclic voltammetry for analysis of material stability at high potentials and electrochemical impedance spectroscopy (EIS) techniques for measurements of ionic conductivity. Testing can be conducted with the sample material sandwiched between two electrochemically "blocking" stainless steel electrodes. This will ensure that only the relevant properties of the electrolyte material are measured. The material and processing methods can be optimized to give the highest ionic conductivity and electrochemical potential window stability feasible prior to attempted integration with novel cathode and anode materials.

Understanding of interface formation and associated implications for total device performance can be most practically accomplished by constructing so-called "coin" cell devices that will consist of an experimental electrode in combination with an optimized solid polymer electrolyte and a complementary control electrode, likely lithium metal. Electrochemical performance of the new materials can be assessed using cyclic voltammetry and interfacial impedance by electrochemical impedance spectroscopy. Finally, after each component is optimized and tested, complete devices can be assembled and tested.

In the first and primary approach, the ORB cathode can be slurry cast onto a carbon coated aluminum current collector. A layer of solid state electrolyte can be deposited on the cathode surface with a slurry printing process. After drying and compression, a nanotube paper anode can be added to complete the cell sandwich.

In the second approach, weighed electrolyte materials are cold pressed at 8 metric tons. In the same die, composite cathode powders composed of the organic radical, un-doped carbon nanotubes and solid electrolyte can be pressed onto one side of the electrolyte layer to form a monolith. Finally, the radical B-doped nanotube paper anode is pressed to the other side of the pellet at 8 metric ton to serve as negative electrode. The entire sandwich structure can then be released and placed into a coin cell casing and sealed to form a complete cell. The quality of the sandwich can be characterized by cross section Scanning Electron Microscopy, SEM.

The coin cell performance can then be thoroughly characterized by common electrochemical techniques. In addition to common battery testing protocols, EIS can serve as a tool in assessing the primary source of cell impedance. By comparing the cathode resistance with that observed in the liquid electrolyte cell, one can assess the interfacial impedance between the electrolyte layer and the composite cathode. The capacities of the cell as a function of cycling rate can be evaluated. Cycling stability can be measured by both capacity retention and coulomb efficiency.

The Examples discussed above are provided for purposes of illustration and are not intended to be limiting. Still other embodiments and modifications are also contemplated.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope.

We claim:
1. A rechargeable battery comprising:
a magnesium-based anode comprising a nanostructured material, wherein the nanostructured material comprises at least one of a carbon-based nanostructured material, doped carbon nanotubes, undoped carbon nanotubes, fullerenes, mesocarbon microbeads, carbon fibers, graphene, boron-doped nanotubes, nitrogen-doped nanotubes, BCN nanostructures, or combinations thereof, wherein the anode further comprises at least one metallic nanoparticle comprising a metallic magnesium, a magnesium alloy, a magnesiated carbon, a magnesium-carbon mixture, a magnesium oxide complex, a magnesium oxide/carbon mixture, a combination of organic radicals and metallic nanostructures, a combination of organic radical and semiconducting metal oxide nanostructures, a combination of nanostructured carbon materials and magnesium, a magnesium oxide, or mixtures thereof;

a cathode comprising a stable polymeric organic radical-based material comprising at least one of

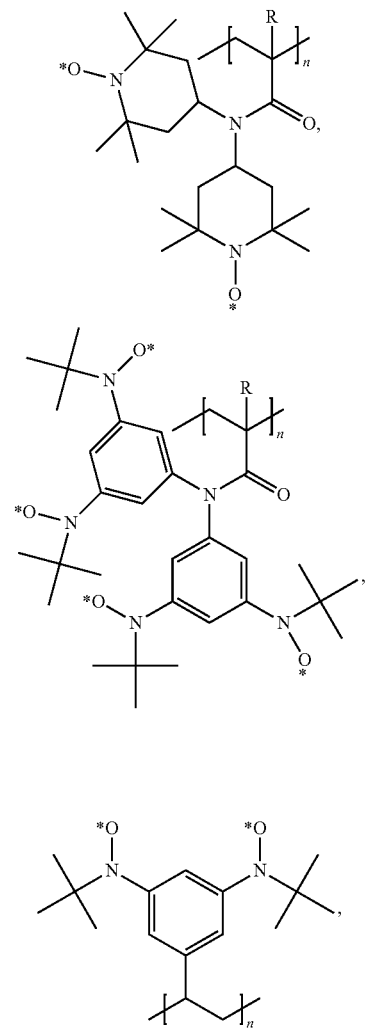

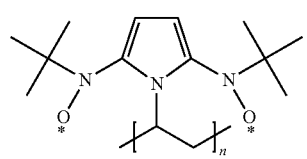

-continued

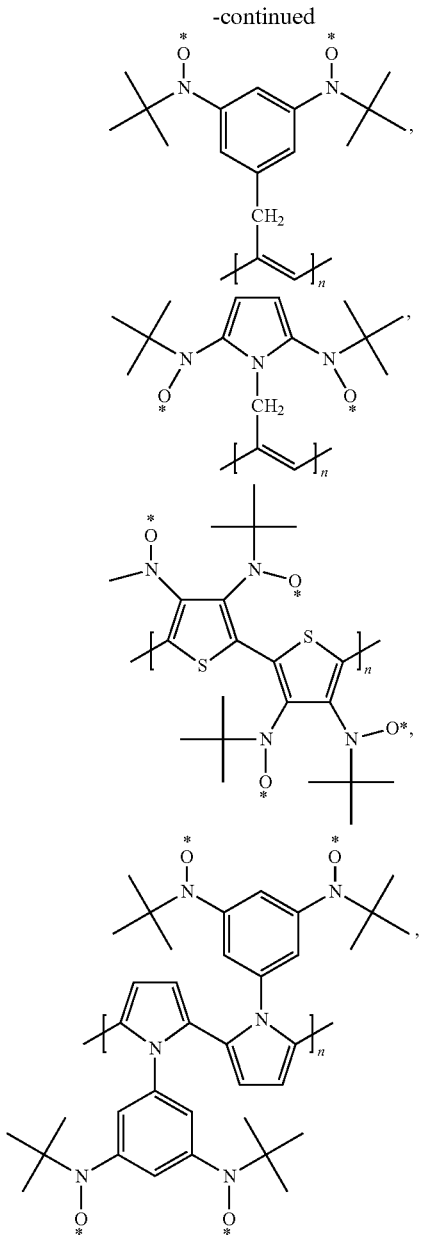

or combinations thereof; and
an electrolyte.

2. The rechargeable battery of claim 1, further comprising at least one anode or cathode current collector.

3. The rechargeable battery of claim 1, wherein the polymeric organic radical-based material comprises magnesiated carbon ORBs, magnesium sulfides, magnesium oxide, inorganic carbon composite materials, or any combination thereof.

4. The rechargeable battery of claim 1, wherein the polymeric organic radical-based cathode reaches a capacity of at least 200 mAh/g.

5. The rechargeable battery of claim 1, wherein the polymeric organic radical-based cathode reaches a capacity in a range between 111-140 mAh/g.

6. The electrochemical device of claim 1, wherein the electrolyte comprises a solid-state electrolyte of magnesium ($Mg^{+2}$) or ammonium ($NH_4^+$) based electrolyte salts or any other electrolyte that does not form non-radical species.

7. The rechargeable battery of claim 1, wherein the electrolyte comprises $Mg(AlCl_2RR')_2$ complexes, THF ionic liquids such as, N-methylN-propylpiperidinium bistrifluoromethanesulfonylimide; N,N-diethyl-N-methyl-N-(2-methoxyethyl)ammonium (DEME+) with mixed anion of bis (trifluoromethanesulfonyl)imide (TFSI−) and bis (fluorosulfonyl)imide (FSI−); Trihexyl(tetradecyl) phosphonium chloride; 1M $Mg(CF_3SO_3)_2$/THF, or any combination thereof.

8. The rechargeable battery of claim 1, wherein the electrolyte exhibits a conductivity of up to at least $10^{-3}$ S/cm at 25° C.

9. The rechargeable battery of claim 1, wherein the electrolyte is exposed to temperatures in the range from about 10° C. to about 60° C.

10. The rechargeable battery of claim 1, wherein the electrolyte has a wide electrochemical window in the range from about 200mV to about 1.6V.

11. The rechargeable battery of claim 2, wherein the cathode and anode current collectors are selected from aluminum, gold, and refractory metals.

12. The rechargeable magnesium battery of claim 1, wherein the electrolyte comprises a solid-state electrolyte comprising at least one of $Mg^{+2}$, $NH_4^+$, or combinations thereof.

13. The rechargeable magnesium battery of claim 1, wherein the electrolyte comprises a solid-state electrolyte comprising $Mg^{+2}$.

* * * * *